United States Patent
Link et al.

(10) Patent No.: US 8,644,791 B2
(45) Date of Patent: Feb. 4, 2014

(54) COMMUNICATIONS MODULE APPARATUS, INTEGRATED CIRCUIT AND METHOD OF COMMUNICATING DATA

(75) Inventors: Leonhard Link, Kirchseeon (DE); Jerome Casters, Toulouse (FR); Engelbert Wittich, Wartenberg (DE)

(73) Assignee: Freescale Semiconductor, Inc., Austin, TX (US)

( * ) Notice: Subject to any disclaimer, the term of this patent is extended or adjusted under 35 U.S.C. 154(b) by 210 days.

(21) Appl. No.: 13/055,968

(22) PCT Filed: Jul. 31, 2008

(86) PCT No.: PCT/IB2008/054165
§ 371 (c)(1),
(2), (4) Date: Jan. 26, 2011

(87) PCT Pub. No.: WO2010/013096
PCT Pub. Date: Feb. 4, 2010

(65) Prior Publication Data
US 2011/0125945 A1 May 26, 2011

(51) Int. Cl.
*H04M 9/00* (2006.01)
(52) U.S. Cl.
USPC ............................ 455/402; 340/310.01
(58) Field of Classification Search
USPC ............... 455/402, 403, 67.11, 550.1, 574.1, 455/575.1, 127.1; 340/538, 538.11, 538.15, 340/310.01; 330/9
See application file for complete search history.

(56) References Cited

U.S. PATENT DOCUMENTS

| | | | |
|---|---|---|---|
| 4,298,843 A * | 11/1981 | Nixon | 330/9 |
| 6,320,494 B1 * | 11/2001 | Bartels et al. | 340/538.11 |
| 7,006,815 B2 | 2/2006 | Lehr | |
| 7,203,849 B2 | 4/2007 | Dove | |
| 2002/0053970 A1 | 5/2002 | Plummer | |
| 2003/0123570 A1 | 7/2003 | Cecchi et al. | |
| 2005/0185665 A1 | 8/2005 | Uboldi | |
| 2005/0264973 A1 | 12/2005 | Gardner et al. | |
| 2006/0066352 A1 | 3/2006 | Davis et al. | |

FOREIGN PATENT DOCUMENTS

| | | |
|---|---|---|
| DE | 19740334 A1 | 3/1999 |
| EP | 1404078 A | 3/2004 |
| EP | 1145494 B1 | 10/2006 |
| EP | 1764947 A2 | 3/2007 |
| WO | 99/46868 A | 9/1999 |
| WO | 01/54298 A | 7/2001 |

OTHER PUBLICATIONS

International Search Report and Written Opinion correlating to PCT/IB2008/054165 dated Jun. 5, 2009.

* cited by examiner

*Primary Examiner* — Thanh Le

(57) ABSTRACT

A communications module apparatus for an automotive network comprises an input for receiving data to be transmitted. The apparatus also comprises a first output for coupling to a first bus line and a second output for coupling to a second bus line. An alternating voltage signal transmission circuit for transmitting at least part of the received data is also provided. The alternating voltage signal transmission circuit is coupled to the first output and the second output.

20 Claims, 4 Drawing Sheets

COMMUNICATIONS MODULE APPARATUS, INTEGRATED CIRCUIT AND METHOD OF COMMUNICATING DATA

FIELD OF THE INVENTION

This invention relates to a communications module apparatus of the type that, for example, transmits data and serves as a source of electrical power for a remote module. The present invention also relates to an integrated circuit of the type that, for example, transmits data and provides a source of electrical power for a remote module. The present invention further relates to a method of communicating data in an automotive network, the method being of the type that, for example, transmits data and provides electrical power for a remote module.

BACKGROUND OF THE INVENTION

In the field of automotive electronics, it is known to provide automotive networks in a vehicle in order to interconnect a number of functional units distributed about the vehicle, for example remote sensor devices and actuators and control units. In order to achieve this aim, the automotive network has to provide a robust moderate speed interconnection between a primary node and satellite nodes. One known topology of a typical automotive network is a master-slave network topology, where a master module sends data to one or more slave modules over a bus and the one or more slave modules respond to the master module using the bus. The automotive network is therefore specified or standardised at a data level in relation to message protocols and classes, formats, bit transmission orders and a method of programming devices having programmable addresses. For example, known protocols that can be used for the automotive network include the Local Interconnect Network (LIN) or Controller Area Network (CAN) protocols.

One example application of the automotive network is communication between ultrasonic parking sensor modules and a central master module. For this application, the sensor modules constitute slave modules and can comprise a microprocessor, a power supply and a transducer. In this example, the master module initiates emission of ultrasonic waves by the slave modules and then receives and interprets data transmitted back by the slave modules. Of course, other applications exist, for example heating and climate control applications, keypad control and/or control of any other de-centralised human interface.

However, with the advance and increase of technology incorporated into vehicles, both hardware and software, Electronic Control Units (ECUs) constituting the master and slave modules in the automotive network are being required to perform increasingly complex tasks and hence require increased computing power. The increased computing power demanded requires a corresponding increase in supply current in order to power the ECUs adequately. Additionally, the increased complexity of some of the tasks that need to be performed have associated higher information exchanges between the master module and the slave modules requiring increased data communication rates. However, in order to reduce Radio Frequency (RF) emissions in order to provide Electromagnetic Compatibility (EMC) compliance and to withstand Electrostatic Discharge (ESD) events, capacitors are provided on the bus mentioned above. Whilst provision of the capacitors has the positive benefits mentioned above, the capacitors limit the data rates achievable using the automotive network. Examples of buses that suffer from this drawback are the bus used for Peripheral Sensor Interface (PSI5) specification and the bus used in the Distributed System Interface (DSI) specification. Additionally, these buses are unable to support the additional electrical power requirements mentioned above.

Whilst the physical "lines" that support the LIN protocol mentioned above are able to support the above speed and power requirements, the so-called "LIN bus" is a three-line/wire bus and, due to environmental considerations as well as cost implications, it is desirable to reduce the number of lines forming the communications bus of the automotive network. The bus also needs to support full duplex communications.

SUMMARY OF THE INVENTION

The present invention provides a communications module apparatus as described in the accompanying claims.

The present invention provides an integrated circuit as described in the accompanying claims.

The present invention provides a method of communicating data for an automotive network as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
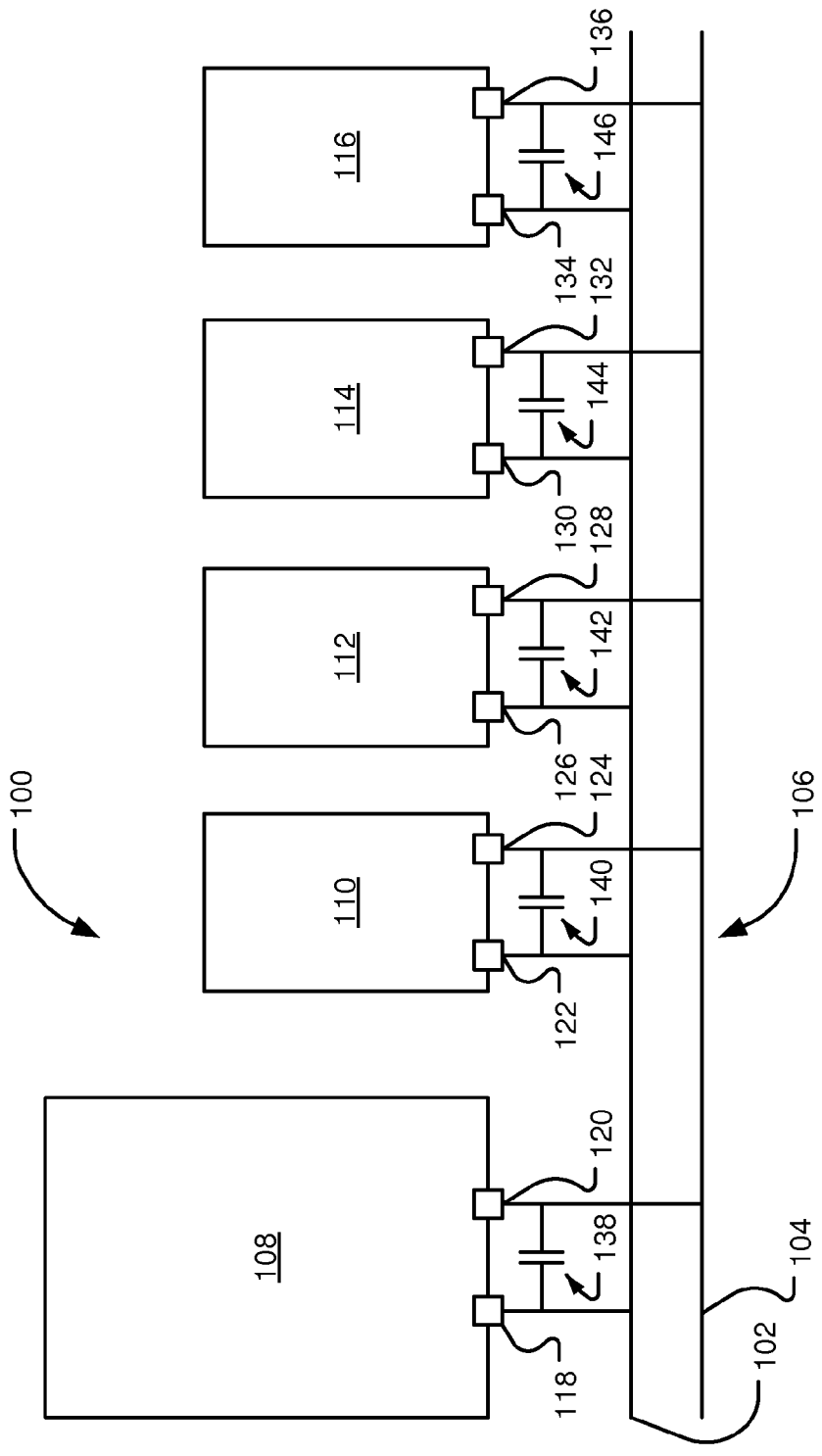
FIG. 1 is a schematic diagram of an example of a system constituting an embodiment of the invention.

Because the examples may, for the most part, be implemented composed of electronic components and circuits known to those skilled in the art, circuit details will not be explained in any greater extent than that considered necessary as illustrated below, for the understanding and appreciation of the underlying concepts of the present invention and in order not to obfuscate or distract from the teachings of the present invention.

Throughout the following description, identical reference numerals will be used to identify like parts.

Referring to FIG. 1, a communications system 100 is shown which comprises a first bus line 102 and a second bus line 104 constituting a two-line bus 106. The first and second bus lines 102, 104 support a private network employing a dedicated circuit, for example an automotive network. In this example, a master-slave topology is employed, the bus 106 serving as a common bus shared by a master module 108, a first slave module 110, a second slave module 112, a third slave module 114 and a fourth slave module 116.

The master module 108 comprises a first Input/Output (I/O) terminal 118 coupled to the first bus line 102 and a second I/O terminal 120 coupled to the second bus line 104. Similarly, the first slave module 110 comprises a first I/O terminal 122 coupled to the first bus line 102 and a second I/O terminal 124 coupled to the second bus line 104. The second slave module 112 comprises a first I/O terminal 126 coupled to the first bus line 102 and a second I/O terminal 128 coupled to the second bus line 104. The third slave module 114 comprises a first I/O terminal 130 coupled to the first bus line 102 and a second I/O terminal 132 coupled to the second bus line 104. Also, the fourth slave module 116 comprises a first I/O terminal 134 coupled to the first bus line 102 and a second I/O terminal 136 coupled to the second bus line 104.

In order to reduce Radio Frequency (RF) emissions so as to provide Electromagnetic Compatibility (EMC) compliance and provide immunity to Electrostatic Discharge (ESD) events, a first capacitor 138 is coupled between the first and second I/O terminals 118, 120 of the master module 108. A second capacitor 140 is also coupled between the first and second I/O terminals 122, 124 of the first slave module 110. A third capacitor 142 is also coupled between the first and second I/O terminals 126, 128 of the second slave module 112. A fourth capacitor 144 is coupled between the first and second I/O terminals 130, 132 of the third slave module 114. Likewise, a fifth capacitor 146 is coupled between the first and second I/O terminals 134, 136 of the fourth slave module 116.

In this example, the communications system 100 is part of a parking assistance system for a vehicle, and controls and monitors Electronic Control Units (ECUs), the slave modules in this example, comprising a microprocessor (not shown), an ultrasonic transducer (not shown) and a power supply (not shown in FIG. 1). The first, second, third and fourth slave modules 110, 112, 114, 116 are, in this example, disposed at the periphery of the vehicle, the first, second, third and fourth slave modules 110, 112, 114, 116 being separated from each other by up to approximately 4 meters. Additionally, a portion of the bus 106 that separates the master module 108 from one or more of the slave modules 110, 112, 114, 116 is up to approximately 8 meters in length.

The master module 108 and the first, second, third and fourth slave modules 110, 112, 114, 116 can operate in accordance with any suitable communications protocol, for example an automotive communications protocol. The details of the communications protocol are not directly related to the explanation of this embodiment and so, for the sake of clarity and conciseness of description, the detail of the protocol will not be described further herein. Instead, attention will be given hereinbelow to communication at the physical level. To this end, in order to better explain the structure and operation of the communications system 100 and components thereof, the foregoing description will be limited to communication at the physical level between the master module 108 and the first slave module 110. However, the skilled person should recognise that the principles of communication between the master module 108 and the first slave module 110 can be expanded and applied to communication between the master module 108 and a greater number of slave modules, as suggested above in relation to FIG. 1.

Figure 2:
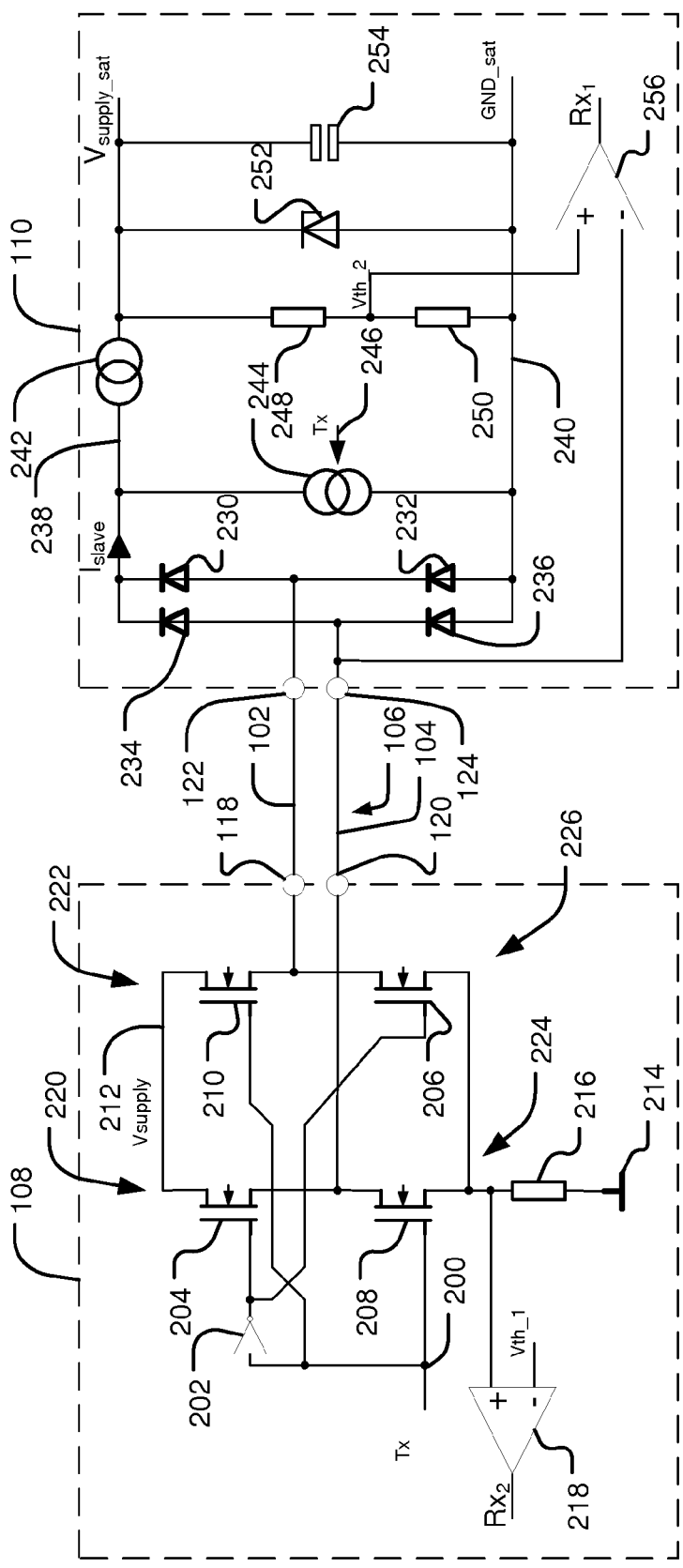
FIG. 2 is a schematic diagram of an example of a master module and an example of a slave module of FIG. 1.

Turning to FIG. 2, in order to support communications at the physical level, the master module 108 comprises an alternating voltage signal transmission circuit. The alternating voltage signal transmission circuit comprises an input terminal 200 coupled to an input of an inverter 202. An output of the inverter 202 is coupled to a gate terminal of a first n-channel Metal Oxide Semiconductor Field Effect Transistor (MOSFET) 204 and a gate terminal of a second n-channel MOSFET 206. The input of the inverter 202 is coupled to a gate terminal of a third n-channel MOSFET 208 and a gate terminal of a fourth n-channel MOSFET 210. Drain terminals of the first and fourth MOSFETs 204, 210 are coupled to a first supply rail 212, a source terminal of the first MOSFET 204 being coupled to a drain terminal of the third MOSFET 208 and a source terminal of the fourth MOSFET 210 being coupled to a drain terminal of the second MOSFET 206. Source terminals of the second and third MOSFETs 206, 208 are coupled to a first ground potential rail 214 via a resistance 216. The source terminals of the second and third MOSFETs 206, 208 are also coupled to a non-inverting input of a first amplifier circuit 218, an inverting input of the first amplifier circuit 218 being coupled to a first source (not shown) of a first threshold voltage, $V_{th1}$. The first amplifier circuit 218 also has a first output terminal, the first amplifier circuit 218 serving as a first receiver unit. For the avoidance of doubt, the first amplifier circuit 218 is not part of the alternating voltage signal transmission circuit, but is coupled to said circuit.

In order to provide an output signal, the source of the fourth MOSFET 210 and the drain of the second MOSFET 206 are coupled to the first I/O terminal 118 of the master module 108, and the source of the first MOSFET 204 and the drain of the third MOSFET 208 are coupled to the second I/O terminal 120 of the master module 108.

It should be appreciated that the first, second, third and fourth MOSFETs 204, 206, 208, 210 constitute respective first, second, third and fourth electronic switching devices, the switching devices being arranged as an H-bridge having a first quadrant 220, a second quadrant 222, a third quadrant 224 and a fourth quadrant 226. The first MOSFET 204 is provided in the first quadrant 220, the fourth MOSFET 210 is provided in the second quadrant 222, the third MOSFET 208 is provided in the third quadrant 224 and the second MOSFET 206 is provided in the fourth quadrant 226.

At the first slave module 110, the first I/O terminal 122 of the first slave module 110 is coupled to an anode of a first diode 230 and a cathode of a second diode 232. The second I/O terminal 124 of the first slave module 110 is coupled to an anode of a third diode 234 and a cathode of a fourth diode 236. Cathodes of the first and third diodes 230, 234 are coupled to a second supply rail 238 of the first slave terminal 110. Anodes of the second and fourth diodes 232, 236 are coupled to a second ground potential rail 240. The first, second, third and fourth diodes 230, 232, 234, 236 constitute a rectifier, in particular a full-wave rectifier. In this example, the rectifier is a bridge rectifier.

The cathodes of the first and third diodes 230, 234 are also coupled to a first terminal of a first current source 242 and a first terminal of a second, variable, current source 244 having a data input terminal 246. A second terminal of the second current source 244 is also coupled to the second ground potential rail 240.

A second terminal of the first current source 242 is coupled to a potential divider and so is coupled to a first terminal of a first resistance 248 and a second terminal of the first resistance 248 is coupled to a first terminal of a second resistance 250, a second terminal of the second resistance 250 being coupled to the second ground potential rail 240. A zener diode 252 is coupled across the potential divider 248, 250. Likewise, an energy storage element, in this example a capacitor 254, is coupled across the potential divider 248, 250 and the zener diode 252.

A second amplifier circuit 256, serving as a second receiver unit, comprises a non-inverting input coupled to the second terminal of the first resistance 248 and the first terminal of the second resistance 250. An inverting input of the second amplifier circuit 256 is coupled to the second I/O terminal 124 of the first slave module 110. The second amplifier circuit 256 also comprises an output terminal.

Figure 3:
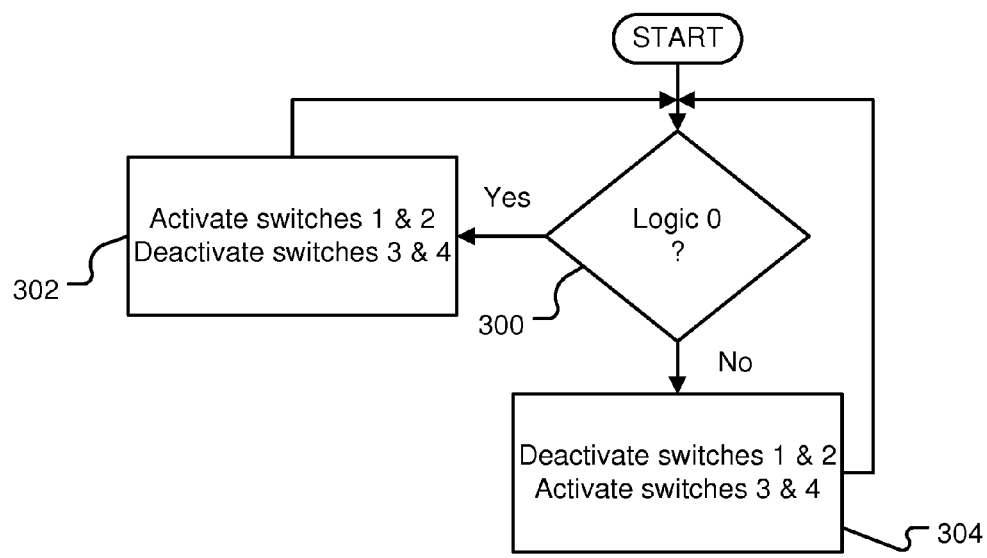
FIG. 3 is a flow diagram of operation of the master module of the example of FIG. 1.
Figure 4:
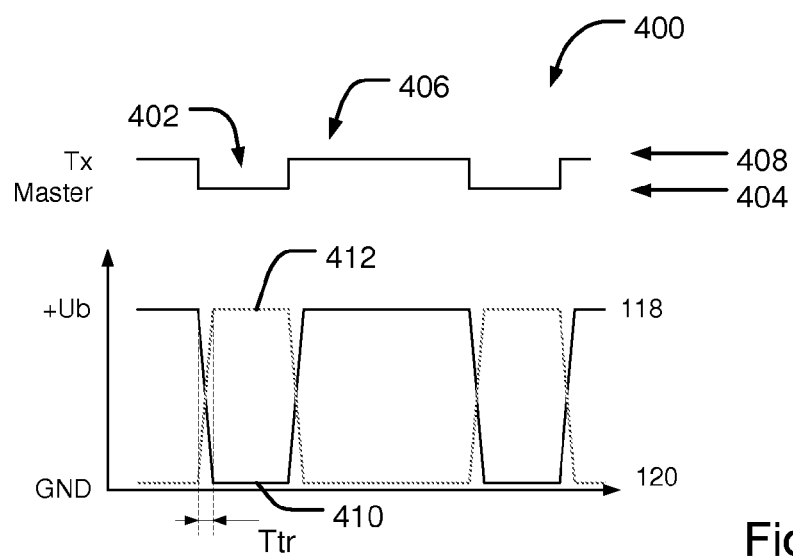
FIG. 4 is an illustration of waveforms generated in relation to the example of the master module of FIG. 2.

In operation (FIG. 3), a data signal 400 (FIG. 4) is received at the input terminal 200 constituting a first bit stream comprising a first bit 402 having a first logic level 404 corresponding to a logic 0 and a second bit 406 having a second logic level 408 corresponding to a logic 1. In response to receipt of the first bit (logic 0) 402 (Step 300), the inverter 202 generates a logic 1 inverted signal that is applied to the gate terminals of the first MOSFET 204 and the second MOSFET 206 (Step 302). The first and second MOSFETs 204, 206 therefore enter a conduction state. In contrast, the logic 0 level of the first bit 402 applied to the gate terminals of the third and fourth MOSFETs 208, 210 results in the third and fourth MOSFETs 208, 210 remaining in a non-conductive state. Consequently, the first I/O terminal 118 of the master module 108 is substantially at ground potential 410 and the second terminal 120 of the master module 108 is at substantially the same potential as the first supply rail 212, namely supply potential 412.

When the first bit stream transitions to the second bit 406 at logic level 1, the inverter 202 generates a logic 0 inverted signal that is applied to the gate terminals of the first MOSFET 204 and the second MOSFET 206. The first and second MOSFETs 204, 206 therefore enter a non-conductive state. In contrast, the logic 1 level of the second bit 406 applied to the gate terminals of the third and fourth MOSFETs 208, 210 results in the third and fourth MOSFETs 208, 210 entering a conduction state (Step 304). Consequently, the first I/O terminal 118 of the master module 108 is at substantially the same potential as the first supply rail 212, namely the supply potential 412 and the second terminal 120 of the master module 108 is substantially at the ground potential 410.

Hence, it can be seen that a first pair of quadrants 220, 226 diagonally opposite a second pair of quadrants 222, 224 of the H-bridge topology enter conduction states in a time-separated manner in order to provide opposite directions of current flow. An alternating voltage signal therefore results having a waveform comprising a first portion corresponding to a first current flow direction and a second portion corresponding to a second current flow direction. When the diagonally opposite pairs of quadrants alternate between conductive and non-conductive states, a transition time, $T_{tr}$, exists between the respective pairs of MOSFETs transitioning between the non-conductive and conductive states when the potential difference across the first bus line 102 and the second bus line 104 crosses 0V. During theses changes of polarity in the voltage sent by the master module 108, communications from the first slave module 110 are interrupted. Further details of this interruption will be described hereinbelow once operation of the first slave module 110 has firstly been described.

At the first slave module 110, the alternating voltage signal transmitted by the master module 108 is received across the first and second I/O terminals 122, 124 of the first slave module 110. The bridge rectifier 230, 232, 234, 236 converts the alternating voltage signal to a constant polarity signal that is applied across the capacitor 254 and so serves to energise or charge the capacitor 254 so that the capacitor 254 is able to store electrical energy to power the first slave module 110.

In addition, the alternating voltage signal applied across the first and second I/O terminals 122, 124 of the first slave module 110 is also received by the amplifier circuit 256 that is arranged as a comparator, deriving a second threshold voltage, $V_{th2}$, from the potential divider 248, 250, and generates a voltage output signal, Rx, from the alternating voltage signal received. The voltage output signal, $Rx_1$, is subsequently processed by a microprocessor (not shown) of the first slave module 110.

Figure 5:
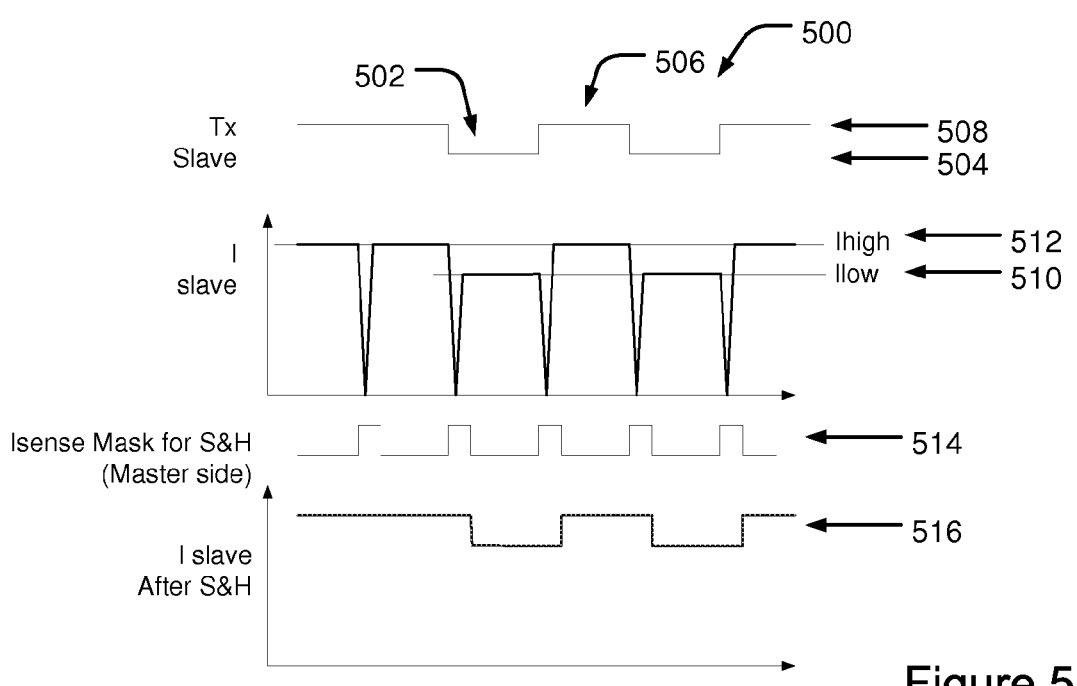
FIG. 5 is an illustration of waveforms generated in relation to the example of the slave module of FIG. 2.

In order to transmit data back to the master module 108 from the first slave module 110, a second bit stream 500 (FIG. 5) generated by, for example, the microprocessor to be transmitted back to the master module 108 is provided at the data input terminal 246. In this respect, the second bit stream 500 comprises a first bit 502 having a first logic level 504 corresponding to a logic 0 and a second bit 506 having a second logic level 508 corresponding to a logic 1.

Responsive to the logic level of the first bit 502, the second, variable, current source 244 attempts to generate a first current level 510 corresponding to the logic 0 level approximately for the duration of the first bit 502. Thereafter, when the logic level of the second bit 506 is applied to the data input terminal 246 of the second current source 244, the second current source 244 attempts to generate a second current level 512 corresponding to the logic 1 level approximately for the duration of the second bit 506. An amplitude modulated current signal therefore results.

However, due to the transition described above, current is unable to flow during the transition time, $T_{tr}$, and so in order to avoid interruption of the second bit stream 500 sent by the first slave module 110 when received at the master module 108, a sample and hold circuit (not shown) is provided at the output of the first amplifier circuit 218. In this example, like the second amplifier circuit 256, the first amplifier circuit 218 serves as a comparator, generating a second voltage output signal, $Rx_2$, corresponding to the second bit stream 500 transmitted by the first slave module 110.

As mentioned above, the transmission of the amplitude modulated current signal by the first slave module 110 is interrupted during occurrences of the transition time, $T_{tr}$. However, by using a masking signal 514 synchronised to the occurrences of the transition time, $T_{tr}$, the sample and hold circuit can be controlled to maintain the signal transmitted by the first slave module 110 during the occurrences of the transition time, $T_{tr}$. Once each occurrence of the transition time, $T_{tr}$, has elapsed, the output signal of the first amplifier circuit 218 is used as a source of the output data, resulting in an apparently uninterrupted data stream 516.

The ratio of the transition time, $T_{tr}$, to received bit duration determines performance of this approach employing the sample and hold circuit. The interruptions can be treated as jitter superposed on the second bit stream 500 received from the first slave module 110. Consequently, as communications protocols used to communicate data over automotive (and other) networks are designed to handle jitter, full duplex communication is effectively achieved and appears to the network as full duplex, herein referred to as "quasi full duplex", (although true full duplex is not achieved), provided the transition time, $T_{tr}$, is maintained within the limit of tolerated signal edge transition jitter of the communications protocol employed so that the communications protocol does not recognise the second bit stream 500 received from the first slave module 110 as anything other than containing jitter.

It is thus possible to provide a communications module apparatus, an integrated circuit and a method of buffer apparatus, an integrated circuit and a method of communicating data in an automotive network that is capable of supporting greater data rates for communication over a bus whilst also serving as a power source for slave devices, where the bus is a two-line bus. In this respect, use of the alternating voltage signal serves actively to charge and discharge the capacitors 138, 140, 142, 144, 146 provided for EMC purposes and ESD protection, thereby enabling the higher data rates to be achieved. By supporting a two-line bus, the materials required to provide the bus are reduced, resulting in a corresponding production cost saving. Furthermore, it is also possible to provide substantially uninterrupted power to one or more slave module. The apparatus, method and integrated circuit also provide robustness against injected noise as both transmitted signal levels are actively driven and "glitches" during data transmission, thereby reducing noise margin.

Of course, the above advantages are exemplary, and these or other advantages may be achieved by the invention. Further, the skilled person will appreciate that not all advantages stated above are necessarily achieved by embodiments described herein.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

As used herein, the term "bus" is used to refer to a plurality of signals or conductors which may be used to transfer one. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors and so many options exist for transferring signals.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of the master module 108 are circuitry located on a single integrated circuit or within a same device. Alternatively, the master module 108 may include any number of separate integrated circuits or separate devices interconnected with each other. For example, the first amplifier circuit 218 may be located on a same integrated circuit as the H-bridge or on a separate integrated circuit or located within another peripheral discretely separate from other elements of the master module 108. Also for example, the master module 108 or portions thereof may be soft or code representations of physical circuitry or of logical representations convertible into physical circuitry. As such, the master module 108 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A communications module apparatus comprising:
an input to receive data to be transmitted;
a first input to couple to a first bus line;
a second input to couple to a second bus line;
an alternating voltage signal transmission circuit to transmit at least part of the received data, the alternating voltage signal transmission circuit constituting a power source and being coupled to the first input and the second input; and
a sample and hold circuit; wherein the alternating voltage signal transmission circuit is arranged to generate an alternating voltage signal that changes polarity during a transition time; and the sample and hold circuit is controlled to maintain a signal received via the first and second inputs during the occurrence of the transition time.

2. An apparatus as claimed in claim 1, wherein the alternating voltage signal transmission circuit is arranged to generate an alternating voltage signal.

3. An apparatus as claimed in claim 2, wherein the alternating voltage signal comprises a waveform having a first portion corresponding to a first current flow direction and a second portion corresponding to a second current flow direction, the second current flow direction being opposite to the first current flow direction.

4. An apparatus as claimed in claim 3, wherein the alternating voltage signal transmission circuit comprises a plurality of electrical switching devices arranged to generate the first and second current flow directions in response to respective logic levels of the received data.

5. An apparatus as claimed in claim 2, wherein the first current flow direction corresponds to a first logic level and the second current flow direction corresponds to a second logic level.

6. An apparatus as claimed in claim 1, wherein the transceiver is arranged to communicate data using a pair of bus lines.

7. An apparatus as claimed in claim 1, wherein the alternating voltage signal transmission circuit comprises an H-bridge topology.

8. An apparatus as claimed in claim 7, wherein the alternating voltage signal transmission circuit comprises an electrical switching device disposed in each quadrant of the H-bridge topology.

9. An apparatus as claimed in claim 7, wherein diagonally opposite pairs of quadrants of the H-bridge topology enter a conduction state in a time-separated manner in order to provide opposite directions of current flow.

10. A master module apparatus comprising the communications module apparatus as claimed in claim 1.

11. A communications system comprising:
a master module comprising the communications module apparatus as claimed in claim 1; and
a slave module comprising a rectifier.

12. A system as claimed in claim 11, wherein the slave module comprises an energy storage element, the energy storage element being coupled to the rectifier.

13. A system as claimed in claim 11, wherein the rectifier is a full-wave rectifier.

14. A system as claimed in claim 11, wherein the rectifier is a bridge rectifier.

15. The apparatus of claim 1, wherein the signal received via the first and second inputs is interrupted during the occurrence of the transition time when the alternating voltage signal changes polarity.

16. The apparatus of claim 1, wherein the first input is an input of a first input/output terminal, and the second input is an input of a second input/output terminal.

17. An integrated circuit apparatus for a communications module apparatus, the apparatus comprising:
an input to receive data to be transmitted to at least one of a plurality of devices;
a first input;
a second input; and
an alternating voltage signal transmission circuit to transmit at least part of the data to the at least one of the plurality of devices, the alternating voltage signal transmission circuit being coupled to the first input and the second input; and
a sample and hold circuit, wherein the alternating voltage signal transmission circuit is arranged to generate an alternating voltage signal that changes polarity during a transition time of the transmission of the data to the at least one of the plurality of devices; and the sample and hold circuit is controlled to maintain a signal received from one of the plurality of devices via the first and second inputs during the occurrence of the transition time.

18. The apparatus of claim 17, wherein the signal received via the first and second inputs is interrupted during the occurrence of the transition time when the alternating voltage signal transmitted to the at least one of the plurality of devices changes polarity.

19. A method of communicating data, the method comprising:
receiving data to be transmitted;
generating an alternating voltage signal having a first current flow direction and a second current flow direction, the first and second current flow directions being indicative of a first logic level and a second logic level, respectively; and
controlling a sample and hold circuit to maintain a signal received via first and second inputs during occurrence of a transition time when the alternating voltage signal changes polarity.

20. The method of claim 19, wherein the signal received via the first and second inputs is interrupted during the transition time when the alternating voltage signal changes polarity.

* * * * *